United States Patent [19]

Jolly

[11] 4,027,868

[45] June 7, 1977

[54] WELDING JIGS

[75] Inventor: Robert Jolly, Preston, England

[73] Assignee: United Kingdom Atomic Energy Authority, Great Britain

[22] Filed: Mar. 22, 1976

[21] Appl. No.: 668,901

[30] Foreign Application Priority Data

Apr. 2, 1975 United Kingdom ............. 13534/75

[52] U.S. Cl. ............................... 269/266; 269/303; 269/309; 269/319; 269/321 W
[51] Int. Cl.² ........................................ B25B 1/24
[58] Field of Search .......... 269/266, 289, 296, 299, 269/303, 309, 319, 321 W

[56] References Cited

UNITED STATES PATENTS

| 1,256,217 | 2/1918 | Fieldhouse | 269/266 |
| 3,537,697 | 11/1970 | Davis | 269/296 |
| 3,689,056 | 9/1972 | Wiltgen | 269/296 |
| 3,818,646 | 6/1974 | Peterson | 269/266 |

Primary Examiner—Al Lawrence Smith
Assistant Examiner—Robert C. Watson
Attorney, Agent, or Firm—Larson, Taylor and Hinds

[57] ABSTRACT

A welding jig comprising a multiplicity of members which are right cylinders each stepped intermediately so as to have a major diameter at one end and a minor diameter at the other end, the members being free-standing on their ends of major diameter and so confined in a regular hexagonal array on a base plate that the major diameters determine the triangular pitch of the members.

5 Claims, 2 Drawing Figures

U.S. Patent  June 7, 1977  4,027,868
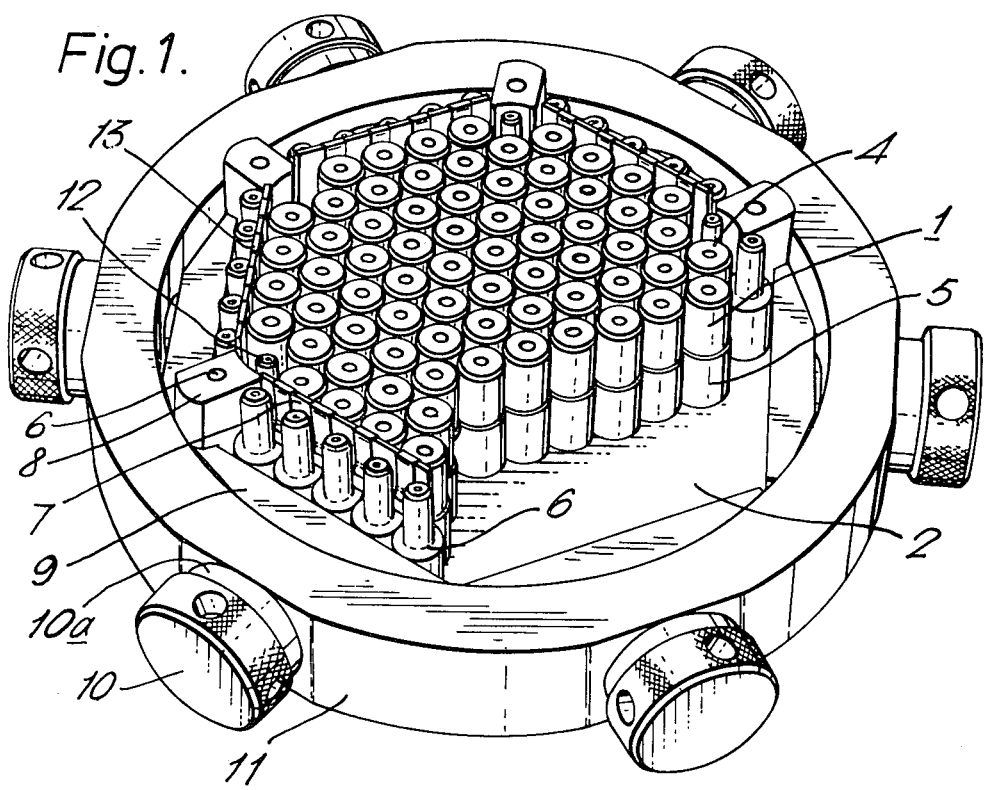
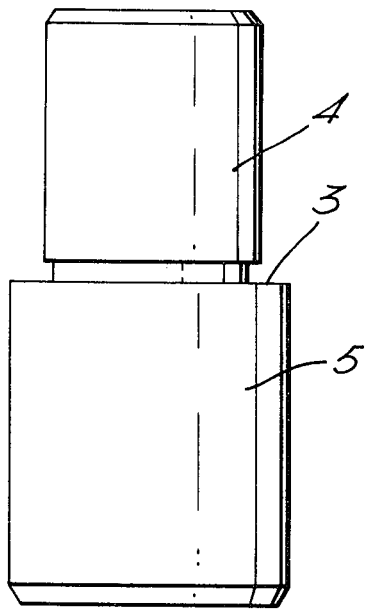

WELDING JIGS

BACKGROUND OF THE INVENTION

This invention relates to welding jigs and finds a particular application in the welding of strip material to form cellular grids for supporting or locating nuclear reactor fuel elements.

In known welding jigs for cellular grids used in nuclear reactor fuel element assemblies a base plate is jig drilled and a peg for each cell of the grid structure is pressfitted into the plate, adhesive being used in addition to ensure a firm fit. The strip material is formed to define cells and is located by pegs whilst being welded. To achieve a satisfactory grid the jig must be made to an extremely fine degree of accuracy calling for very close tolerances on the positions of the drillings for the pins and to produce a jig of such accuracy is expensive. Distortion can also occur when forcing a partly constructed grid on to the jig for welding with the result that the accuracy of the completed grid is impaired. Furthermore, it has been found very difficult to clean between the pegs during maintenance of the grid.

SUMMARY OF THE INVENTION

According to the invention a welding jib comprises a multiplicity of members which are right cylinders each stepped intermediately so as to have a major diameter at one end and a minor diameter at the other end, the members being freestanding on a base plate on their ends of major diameter about an identical member centrally located on the base plate and so confined in a regular hexagonal array on the base plate that the abutting major diameters determine the triangular pitch of the members.

Because each of the cylindrical members is separate the geometric design ensures that the correct hexagonal formation is obtained by controlling only a single basic factor, the exact grinding of the members. Drilling of the base plate is eliminated except for the fixing of the centrally located member. The invention therefore provides a jig which is relatively easy to produce, simplifies grid manufacture and eliminates previous adverse tolerance and damage problems. Furthermore, the jig can be dismantled readily for cleaning and then re-assembled quickly and accurately.

DESCRIPTION OF THE DRAWINGS

The invention will now be further described with reference to the accompanying drawings wherein FIG. 1 is a perspective view of a jig in accordance with the invention and FIG. 2 is a side view of a detail on an enlarged scale.

DESCRIPTION OF THE PREFERRED EMBODIMENTS

In FIG. 1 of the drawings right cylindrical members 1 are shown standing on a base plate 2, some of the members being removed to show the base plate. The members 1 are shown in detail in FIG. 2. The members 1 are each stepped intermediately at shoulder 3 so as to have a minor diameter at one end 4 and a major diameter on which they stand in FIG. 1 at the other end 5. The member 1 in the centre of the base plate 2 is fixed to the plate by inserting a spigot formed on the end 5 in a central socket of the plate. The other members 1 are freestanding and arranged in hexagonal array about the central member with their major diameter ends 5 in contact. The hexagonal array is maintained by elongate plates 7 disposed with their transverse axes normal to the base plate 2 and bounding the hexagonal array of members 1.

The plates 7 are interposed between the outer row of members 1 and a peripheral row of stepped cylinders 6 which are similar to the members 1 and also upstand on their large diameter ends from the base plate 2. A circular housing 11 surrounds the base plate and has six equally spaced clamping screws 10 whilst confining wedges 9 are interposed between the screws 10 and the stepped cylinders 6, the assembly being arranged so that the screws 10 can centripetally clamp the hexagonal array of members.

In FIG. 1 there are shown packing rings 10a interposed between the heads of the screws 10 and the circular housing, the packing rings being of predetermined thickness to provide gauge points for locating the radial positions of the clamping screws. The arrangement enables the screws to be slackened to release a part welded grid from the jig and then to be restored accurately to the predetermined positions when the grid has been returned to the jig. In an alternative construction the circular housing and heads of the screws have complementary indexing marks for achieving the same function. The thicknesses of the packing rings or the positions of the indexing marks are determined by means of a setting plate (not shown in the drawings) having the outline shape and dimensions of a required grid and which is located in the jig by engagement of a central aperture in the setting plate with the central member 1 of the hexagonal array. The heads of the clamping screws 10 have diametral holes 10b for engagement by a tommy-bar. The stepped cylinders 6 at the corners of the hexagonal array carry corner pads 8 which are shaped to abut formed corner pieces for the grid (not shown), the corner pieces fitting over members 12 at the corners of the hexagonal array. The plates 7 and the corner pads 8 define the boundary of the grid and the metal strips may be held in place during welding by U-shaped clips 13 which fit astride the strips and the uppermost edges of the plates 7.

To use the jig for the welding of a grid structure for a nuclear reactor fuel element the appropriate dimensions are selected for the major and minor diameters of the members 1, 7, 12 to obtain the correct spacing of the cells of the grid and allow the insertion between the members of metal strips forming the cells. The jig is made up accordingly and strips of metal, formed separately into individual cells, are fitted over the minor diameter ends 4. The screw members 10 may be slightly slackened to facilitate the insertion of the strips and then tightened up before the strips are spot welded on adjacent exposed edges. The screw members 10 are slackened again to facilitate removal of the partially welded grid which is turned over and replaced on the jig so that the grid can be completed by spot welding the adjacent edges newly exposed.

The size of the grid may be reduced if required by using shorter plates 7 and moving in the members 6 to replace the outer members 1.

I claim:

1. A welding jig for cellular grids for use in nuclear reactor fuel element assemblies, the jig comprising
a base plate,
a multiplicity of members which are right cylinders, each stepped intermediately to define opposed end regions of major and minor diameters, the members being upstanding on the base plate on their ends of major diameter and arranged in regular hexagonal array means for locating the central member of the base plate, the remaining members being free standing on the plate, and means confining the free standing members in hexagonal array on the base plate with the cylindrical surfaces of major diameter of adjoining members in mutual abutment.

2. A welding jig according to claim 1 wherein the means for confining the free standing members in hexagonal array comprises elongate plates disposed with their transverse axes normal to the base plate and bounding the hexagonal array of members.

a row of stepped cylinders having major and minor diameters freestanding about the periphery of the hexagonal array, the elongate plates being interposed between the cylindrical surfaces of the minor diameters of the stepped cylinders and the members, a circular housing surrounding the base plate, six equally spaced clamping screws extending radially through the housing, and confining wedges interposed between the screws and the stepped cylinders, the means being arranged for centripetally clamping the hexagonal array of members.

3. A welding jig according to claim 2 wherein the means for locating the central member of the array at the centre of the base plate comprises a spigot formed on the end region of major diameter of the central member and a socket in the base plate.

4. A welding jig according to claim 3 wherein packing rings are interposed between heads of the clamping screws and the circular housing, the packing rings being of predetermined thickness to provide gauge points for locating the radial positions of the clamping screws.

5. A welding jig according to claim 4 wherein the elongate plates have U-shaped clips astride their uppermost edges for clamping strip material to the elongate plates during welding of the strip material to form a cellular grid.

* * * * *